July 28, 1959 R. P. PUTKOVICH ET AL 2,897,433
DIRECT CURRENT VOLTAGE REGULATOR
Filed April 30, 1958
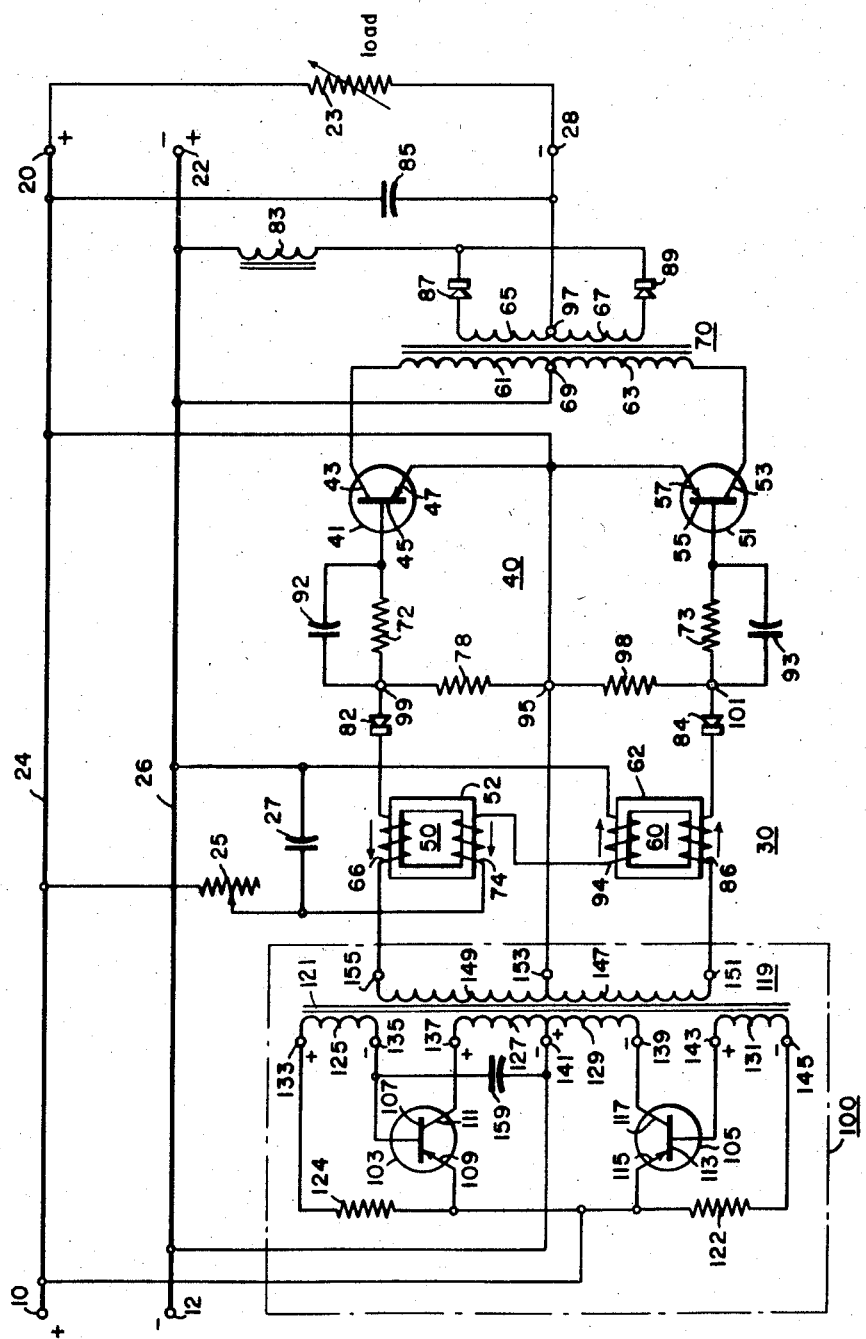
WITNESSES
John E. Heasley Jr.
Clement L. McHale
INVENTORS
Rudy P. Putkovich &
George J. Thompson
BY
F. E. Browder
ATTORNEY United States Patent Office 2,897,433
Patented July 28, 1959

2,897,433

DIRECT CURRENT VOLTAGE REGULATOR

Rudy P. Putkovich, Franklin Township, Westmoreland County, and George J. Thompson, Ross Township, Allegheny County, Pa., assignors to Westinghouse Electric Corporation, East Pittsburgh, Pa., a corporation of Pennsylvania Application April 30, 1958, Serial No. 731,928

8 Claims. (Cl. 323—100)

This invention relates to electrical control apparatus and more particularly to regulator systems.

It is often necessary to provide a regulated unidirectional voltage to a load circuit, even though the voltage of an available source of unidirectional current fluctuates over a wide range. This is particularly a problem in aircraft electrical systems in which unidirectional or direct current is supplied by one or more engine-driven, rotating, direct current generators. It is, therefore, desirable to provide electrical control apparatus, such as a regulator system, having a high efficiency for maintaining at a predetermined value the voltage applied to a load circuit from a source of unidirectional or direct current whose voltage varies over a wide range.

It is an object of this invention to provide a new and improved electrical control system.

Another object of this invention is to provide a new and improved regulator system.

A further object of this invention is to provide a new and improved regulator system, having a high efficiency, for maintaining at a predetermined value the magnitude of the voltage across a load circuit supplied from a source of direct current having a varying voltage.

Other objects of the invention will, in part, be obvious and will, in part, appear hereinafter.

For a fuller understanding of the nature and objects of the invention, reference should be had to the following detailed description taken in connection with the accompanying drawing in which the single figure diagrammatically illustrates this invention.

Referring now to the drawing, there is illustrated a pair of input terminals 10 and 12 to which a source (not shown) of unidirectional or direct current having a varying voltage may be connected. Electric power from a source (not shown) connected at the input terminals 10 and 12 flows through the conductors 24 and 26 to a load circuit including a variable load 23 connected at the output terminals 20 and 28. The input terminal 10 is connected directly to the output terminal 20 by the conductor 24 and the input terminal 12 is connected to the terminal 22 by the conductor 26. A regulator system 30 is connected between the conductors 24 and 26 and the terminals 22 and 28 in order to provide a unidirectional output voltage which adds to the voltage of any source (not shown), connected at the input terminals 10 and 12 to maintain the total voltage across the load circuit connected at the output terminals 20 and 28 at a predetermined value. In general, the unidirectional output voltage provided by the regulator system 30, which appears at the terminals 22 and 28, varies inversely with the voltage applied at the input terminals 10 and 12 and the conductors 24 and 26 in order to maintain the voltage at the terminals 20 and 28 at a predetermined value.

The regulator system 30 includes the first inverter or oscillator means 100, the magnetic amplifiers 50 and 60, the second inverter means or amplifying means 40 and rectifier means which includes the rectifiers 87 and 89.

The first inverter means 100 includes a pair of switching devices, specifically the transistors 103 and 105, which are connected in circuit relation with the source (not shown) of direct current connected at the input terminals 10 and 12. The positive side of a source would be connected to the input terminal 10, and the negative side of a source would be connected at the input terminal 12. The transistors 103 and 105 are preferably of the P–N–P junction type with the transistor 103 having a base electrode 107, an emitter electrode 109 and a collector electrode 111. The transistor 105 includes a base electrode 113, an emitter electrode 115 and a collector electrode 117. It is to be understood that the transistors 103 and 105 could also be of the N–P–N type with suitable changes in the circuit connections.

The first inverter means 100 includes the saturable magnetic core means represented by the numeral 119. The core means 119 includes a magnetic core 121 which is constructed of material designed for magnetic saturation within the range of energization of the core means 119. Preferably, the material utilized in the core 121 is of a commonly available type having a rectangular hysteresis loop. The core means 119 includes a plurality of windings 125, 127, 129 and 131, which link the core 121 and are disposed in inductive relationship with respect to one another. As illustrated, the winding 125 is provided with a pair of terminals 133 and 135. The windings 127 and 129 are provided respectively with the terminals 137 and 139 and constitute together a single winding having a center-tap connection 141. The additional windings 147 and 149 are also provided, which link the magnetic core 121. The additional windings 147 and 149 are provided, respectively, with the terminals 151 and 155 and constitute together a single winding having a center-tap connection 153.

The terminals 137 and 139 of the windings 127 and 129 are connected, respectively, to the collector electrodes 111 and 117 of the transistors 103 and 105. The terminals 133 and 135 of the winding 125 are connected, respectively, to the emitter electrode 109 through the resistor 124 and to the base electrode 107 of the transistor 103. In a similar manner, the terminals 143 and 145 of the winding 131 are connected respectively to the base electrode 113 and to the emitter electrode 115 of the transistor 105 through the resistor 122. The emitter electrodes 109 and 115 of the transistors 103 and 105 are each connected to the positive input terminal 10, and the center-tap connection 141 of the windings 127 and 129 is connected to the negative input terminal 12. With such connections, it is observed that the winding 127 is connected for energization from the input terminals 10 and 12 through the transistor 103, whereas the winding 129 is connected for energization from the input terminals 10 and 12 through the transistor 105.

The operation of the first inverter means 100 will now be described according to the present understanding of the circuit. Let it be assumed initially that for some reason current begins to flow through the emitter 109 to the collector 111 of the transistor 103 from the input terminals 10 and 12 and that substantially zero current flows from the input terminals 10 and 12 through the emitter 115 to the collector 117 of the transistor 105. Under such conditions, the resistance of the transistor 103 is relatively small as compared to the resistance of the transistor 105 with the result that substantially the entire voltage applied at the input terminals 10 and 12 is applied across the winding 127 of the core means 119 to cause current flow from the input terminals 10 and 12 into the terminal 137 of the winding 127. As will presently appear, current flowing from the input terminals 10 and 12 through the winding 127 is effective to induce voltage in the windings 125 and 131 of such polarity and magnitude as to maintain conduction of the transistor 103 in a saturated condition and to maintain a cut-off condition of the transistor 105.

As the magnetic flux in the core 121 increases by reason of continued current flow from the input terminals 10 and 12 through the winding 127, the core 121 approaches a saturated condition with the result that there is substantially no further increase in the magnetic flux in the core 121, and substantially zero voltages are induced in the windings 125, 127, 129 and 131 to thereby render both of the transistors 103 and 105 substantially non-conducting. Consequently, the voltage applied at the input terminals 10 and 12 is effectively disconnected from the winding 127, and substantially zero current flows from the source (not shown) connected at the input terminals 10 and 12 through the winding 127 with the result that substantially zero magnetomotive force is applied to the core 121.

When the magnetomotive force falls from a value sufficient to effect saturation of the core 121 to a zero value, the magnetic flux present in the core 121 is reduced by a small amount because of the magnetic characteristics of the core 121. This reduction in magnetic flux is effective to induce voltages in the windings 125 and 131 having polarities which are opposite to the polarity shown in the drawing so that the transistor 103 is maintained in a cut-off condition and the transistor 105 is caused to conduct. When the transistor 105 starts to conduct, the previously described operation is reversed so that current from the source (not shown) connected at the input terminals 10 and 12 now flows through the transistor 105 and into the terminal 139 of the winding 129. Current flowing through the winding 129 establishes a magnetomotive force which is effective to direct magnetic flux through the core 121 in a direction opposite from the direction of the magnetic flux produced by energization of the winding 127 as previously described.

As current continues to flow from the input terminals 10 and 12 through the winding 129, the magnetic flux in the core 121 increases with respect to time to thereby induce voltages of substantially constant magnitude in the windings 125, 127, 129, 131, 147 and 149 having polarities opposite to the polarities of the voltages induced in such windings when the winding 127 is energized from the input terminals 10 and 12. The voltages induced in the windings 125 and 131 by energization of the winding 129 are effective to maintain the conducting condition of the transistor 105 and the cut-off condition of the transistor 103. When the core 121 becomes saturated, zero voltages are induced in the windings 125, 127, 129, 131, 147, and 149, and both of the transistors 103 and 105 are in a cut-off condition to thereby effectively disconnect the source (not shown) connected at the input terminals 10 and 12 from the winding 129. The magnetic flux in the core 121 is then reduced by a small amount to induce voltages in the windings 125 and 131 of such polarity and magnitude as to effect saturation of the transistor 103 and cut-off of the transistor 105 to thereby initiate another cycle of operation of the first inverter means 100.

The first inverter means 100 is substantially the same as the inverter circuit which is more fully described in U.S. Patent 2,783,384, issued to R. L. Bright et al., and assigned to the assignee of the present invention. In order to assure that one of the transistors 103 and 105 begins to conduct to a greater extent than the other of the transistors for initiating operation of the first inverter means 100, a suitable capacitor 159 is connected between the base electrode of one of the transistors and the negative terminal 12. It is to be understood that a resistor could be substituted for the capacitor 159. The capacitor 159 is connected between the base 107 of the transistor 103 and the negative terminal 12. With the latter arrangement, the transistor 103 will begin to conduct first and the transistor 105 will be cut off.

The resistors 122 and 124 are included in the first inverter means 100 to limit current in the emitter-base paths of the transistors 105 and 103 respectively and to reduce the effect of differences in the impedance characteristics of said transistors.

It is to be noted that two voltage pulses of opposite polarity are induced in the windings 147 and 149 for each complete cycle of operation of the first inverter means 100 to thereby provide an alternating current output at the terminals 151 and 155. The alternating current output has a substantially rectangular wave pattern, and the period of each half cycle of this alternating current voltage is proportional to the time required for the core 121 to become magnetically saturated after each reversal of the conducting conditions of the transistors 103 and 105. It is further observed that the time required for such saturation is inversely proportional to the magnitude of the voltage applied at the input terminals 10 and 12. The frequency, therefore, of the alternating current output at the terminals 151 and 159 varies with the magnitude of the voltage applied at the input terminals 10 and 12.

In general, the magnetic amplifiers 50 and 60 are connected in circuit relationship with the first inverter means 100 and the source (not shown) connected at the input terminals 10 and 12 for changing or converting the alternating current output at the terminals 151 and 155 of the first inverter means to unidirectional pulses of alternating polarity having a width which varies inversely with the voltage applied at the input terminals 10 and 12.

The magnetic amplifier 50 includes the magnetic core member 52, which is constructed preferably of rectangular core loop material. The output or load winding 66 of the magnetic amplifier 50 is disposed in inductive relationship with the magnetic core member 52. The load winding 66 is connected in series circuit relationship with the rectifier 82 and the resistor 78, the series circuit being connected between the terminal 155 and the mid-tap connection 153 of the first inverter means 100. The rectifier 82 is provided to insure that current flows through the load winding 66 in only one direction. Similarly, the magnetic amplifier 60 includes the magnetic core member 62, which is constructed preferably of rectangular core loop material. The load winding 86 of the magnetic amplifier 60 is disposed in inductive relationship with the magnetic core member 62. The load winding 86 is connected in series circuit relation with the rectifier 84 and the resistor 98, the series circuit being connected between the terminal 151 and the midtap connection 153 of the first inverter means 100. The rectifier 84 similarly insures that the current flowing through the load winding 86 always flows in the same direction.

The magnetic amplifier 50 also includes a control winding 74 which is disposed in inductive relationship with the magnetic core member 52. Similarly, the magnetic amplifier 60 includes the control winding 94 which is disposed in inductive relationship with the magnetic core member 62. The control winding 74 of the magnetic amplifier 50 and the control winding 94 of the magnetic amplifier 60 are connected or disposed to be responsive to the voltage applied at the input terminals 10 and 12 since the control windings 74 and 94 are connected in series circuit relation with each other and with the variable resistor 25, the series circuit being connected to the input terminals 10 and 12 through the conductors 24 and 26. In order to stabilize the operation of the regulator system 30, a capacitor 27 is connected in parallel circuit relationship with the series circuit which includes the control windings 74 and 94. The control windings 74 and 94 are so disposed on their respective magnetic core members 52 and 62 that current flow therethrough produces magnetomotive forces which oppose the magnetomotive forces produced by the current flow through the associated load windings 66 and 86, respectively.

The output pulses from the magnetic amplifiers 50 and 60 appear across the resistors 78 and 98 which are connected in series circuit relation between the output terminals 99 and 101, the common terminal 95 between the resistors 78 and 98 being connected to the midtap connection 153 of the windings 147 and 149.

In operation, the magnetic amplifiers 50 and 60 function to convert or change the alternating current output at the terminals 151 and 155 of the first inverter means to unidirectional pulses of alternating polarity which appear across the resistors 78 and 98, respectively, and have a width which varies inversely with the voltage applied at the input terminals 10 and 12 and the conductors 24 and 26. The rectifiers or diodes 82 and 84 also operate to insure that unidirectional pulses of alternating polarity appear across the resistors 78 and 98.

Assuming that during the first half cycle of operation the alternating current output voltage of the first inverter means 100 is negative at the terminal 155 with respect to the voltage at the terminal 151, current will flow from the midtap connection 153 to the terminal 95, through the resistor 78 and the rectifier 82, through the load winding 66 of the magnetic amplifier 50 to the terminal 155. Substantially all of the voltage between the terminal 153 and the terminal 155 will appear across the load winding 66 of the magnetic amplifier 50 until the magnetic core member 52 saturates. During the balance of the assumed half cycle, after the core 52 saturates, substantially all of the voltage between the terminal 153 and the terminal 155 will appear as an output pulse across the resistor 78 between the terminals 95 and 99. The width of the output pulse across the resistor 78 will depend upon the portion of the half cycle required to saturate the core 52 which, in turn, depends upon the current flow to the control winding 74 of the magnetic amplifier 50. The current flow in the control winding 74 varies with the voltage applied at the input terminals 10 and 12 and the conductors 24 and 26. Therefore, the width of the output pulse across the resistor 78 during the assumed half cycle varies inversely with the voltage of the source (not shown) connected at the input terminals 10 and 12. During the assumed half cycle, substantially no current will flow through the load winding 86 of the magnetic amplifier 60 due to the connection of the rectifier 84.

During the next half cycle of the alternating current output at the terminals 151 and 155 of the first inverter means 100, the polarity of the output voltage at the terminal 151 will be negative with respect to the polarity of the output voltage at the terminal 155 of the first inverter means 100. Current will then flow from the midtap connection 153 to the terminal 95, through the resistor 98 to the output terminal 101, through the rectifier 84 and through the load winding 86 of the magnetic amplifier 60 to the terminal 151. During the second half cycle, substantially all of the voltage between the terminals 153 and 151 will appear across the load winding 86 of the magnetic amplifier 60 until the core 62 saturates. During the balance of the second half cycle, after the core 62 saturates, substantially all of the voltage between the terminals 153 and 151 will appear as a unidirectional output pulse of the opposite polarity across the resistor 98 between the terminals 95 and 101. In similar fashion, the width of the output pulse appearing across the resistor 98 will vary inversely with the voltage of the source (not shown) connected to the input terminals 10 and 12.

In summary, the magnetic amplifiers 50 and 60 operate to change or modify the alternating current output at the terminals 151 and 155 of the first inverter means 100 to unidirectional pulses of alternating polarity, which appear across the resistors 78 and 98 and have a width which varies inversely with the voltage applied at the input terminals 10 and 12. It is to be understood that other types of conventional magnetic amplifiers may be employed rather than the particular magnetic amplifiers 50 and 60 shown in the drawing.

In general, the second inverter means or amplifying means 40 is connected in circuit relationship with the magnetic amplifiers 50 and 60 and the source (not shown) connected at the input terminals 10 and 12 for producing alternating output pulses whose width varies with the width of the output pulses from the magnetic amplifiers 50 and 60.

The second inverter means 40, which is of the externally excited or driven type, includes a plurality of transistors 41 and 51 connected to operate in a switching mode. The transistor 41 includes a base electrode 45, an emitter electrode 47 and a collector electrode 43. The transistor 51 includes a base electrode 55, an emitter electrode 57 and a collector electrode 53. The transistors 41 and 51 are preferably of the P-N-P junction type. The base 45 of the transistor 41 is connected to the terminal 99 through the resistor 72 and the capacitor 92, which are connected in parallel circuit relationship. In similar fashion, the base 55 of the transistor 51 is connected to the terminal 101 through the resistor 73 and the capacitor 93, which are connected in parallel circuit relationship. The emitters 47 and 57 of the transistors 41 and 51 respectively are each connected to the common terminal 95 between the resistors 78 and 98 and also to the positive input terminal 10 through the conductor 24. The collector 43 of the transistor 41 is connected to the upper end of the primary winding section 61 of the transformer 70, and the collector 53 of the transistor 51 is connected to the lower end of the primary winding section 63 of the transformer 70. The primary winding sections 61 and 63 together constitute a single winding having a midtap connection 69 which is connected to the negative input terminal 12 through the conductor 26. The transformer 70 also includes the secondary winding sections 65 and 67 which together make up a single winding having a midtap connection 97. The output of the second inverter means 40 appears across the secondary winding sections 65 and 67, as will be explained hereinafter.

In operation, the second inverter means 40 responds to the output pulses from the magnetic amplifiers 50 and 60 to produce alternating output pulses across the secondary winding sections 65 and 67 of the transformer 70. In certain respects, the second inverter means 40 functions to amplify the pulses appearing across the resistors 78 and 98. Depending upon polarity of the unidirectional output pulses from the magnetic amplifiers 50 and 60 which appear across the resistors 78 and 98, respectively, either the transistor 41 is conducting saturation current when an output pulse appears across the resistor 78 or the transistor 51 is conducting saturation current when an output pulse appears across the resistor 98.

When an output pulse appears across the resistor 78, the polarity of the output pulse is positive at the terminal 95 with respect to the polarity of the output at the terminal 99. Current then flows from the terminal 95 into the emitter 47 and out of the base 45 of the transistor 41 through the resistor 72 to the terminal 99. When an output pulse is applied to cause an input signal between the emitter 47 and the base 45 of the transistor 41, the impedance or resistance between the emitter 47 and the collector 43 of the transistor 41 will be reduced to a negligible value, and saturation current will flow from the positive terminal 10 through the conductor 24 into the emitter 47 and out of the collector 43 of the transistor 41, into the upper end of the primary winding section 61, out of the midtap connection 69 and back to the negative terminal 12 through the conductor 26. An output pulse of a first polarity will then appear across the secondary winding sections 65 and 67 of the transformer 70. When a pulse appears across the resistor 78 and current flows from the emitter 47 to the base 45 of the transistor 41 and through the resistor 72, the capacitor 92 will acquire a charge which serves to reduce leakage current from the emitter 47 to the collector 43 of the transistor 41 when no output pulse is present across the resistor 78. The capacitor 92 reduces leakage current through the transistor 41 by discharging and providing a gradually decreasing bias voltage across the resistor 72.

On the other hand, when a pulse appears across the resistor 98, the polarity of the output pulse will be positive at the terminal 95 with respect to the polarity of the output pulse at the terminal 101. When such an output pulse appears across the resistor 98, current will flow from the terminal 95 into the emitter 57 and out of the base 55 of the transistor 51, through the resistor 73 to the terminal 101. When the latter current flows in the emitter-base path of the transistor 51, the impedance or resistance between the emitter 57 and the collector 53 of the transistor 51 will decrease to a negligible value, and saturation current will flow from the positive terminal 10 through the conductor 24, into the emitter 57 and out of the collector 53 of the transistor 51 into the lower end of the primary winding section 63 out of the midtap connection 69 and back to the negative terminal 12 through the conductor 26. An output pulse of the opposite polarity will then appear across the secondary winding sections 65 and 67 of the transformer 70. The resistor 73 and the capacitor 93 operate in similar fashion to the resistance 72 and the capacitor 92 to provide a bias voltage between the base and the emitter of the transistor 51 and to reduce leakage current in the emitter-collector path of the transistor 51 when no output pulse is present across the associated resistor 98.

The value of each of the resistors 78 and 98 is selected to be relatively low compared to the impedance between the emitter and base of the transistors 41 and 51, respectively, during the cut-off condition of the transistors 41 and 51 when no pulse is being applied to the respective transistor to shunt the magnetizing current of the magnetic amplifiers 50 and 60, respectively, away from the emitter-base path of each of the said transistors. It is to be noted that the capacitors 92 and 93 also function to reduce the transition time from the cut-off condition to the saturation current condition of the transistors 41 and 51, respectively, when an output pulse appears across the resistors 78 and 98, respectively, and thus to reduce the power dissipation and associated heating in the transistors 41 and 51.

Rectifier means, specifically the rectifiers 87 and 89, are connected in circuit relation with the second inverter means 40 to convert the alternating current output of the second inverter means 40 to a unidirectional output voltage which appears at the terminals 22 and 28 and which is added to the voltage at the input terminals 10 and 12, the sum of the voltage at the input terminals 10 and 12 and the unidirectional output voltage being applied at the terminals 20 and 28 across the load circuit, which includes the load 23. In particular, the rectifier 87 is connected between the upper end of the secondary winding section 65 and the conductor 26 through the inductance 83. The rectifier 89 is connected between the lower end of the secondary winding section 67 and the conductor 26 through the inductance 83. The midtap connection 97 of the secondary winding sections 65 and 67 is connected directly to the negative output terminal 28 at one end of the load 23 and to the positive terminal 20 of the load circuit through the capacitor 85. The inductance 83 and the capacitor 85 form a conventional filter arrangement for smoothing out the unidirectional output voltage from the rectifiers 87 and 89. The polarity of the unidirectional output voltage from the rectifiers 87 and 89 is arranged to add to the voltage of the source (not shown) which would be connected to the input terminals 10 and 12 and carried to the terminals 20 and 22 by the conductors 24 and 26. The average value of the unidirectional output voltage is inversely proportional to the magnitude of the voltage of the source (not shown) connected at the input terminals 10 and 12, in order to maintain the voltage at the output terminals 20 and 28, which is the sum of the unidirectional output voltage at the terminals 22 and 28 and the voltage applied at the input terminals 10 and 12, at a predetermined value.

The overall operation of the regulator system 30 will now be considered. It will be assumed that the variable resistor 25 is adjusted initially for a particular value of voltage at the input terminals 10 and 12 in order to obtain a desired voltage across the load 23 at the output terminals 20 and 28. Initially, the width of the output pulses from the magnetic amplifiers 50 and 60 will be such as to cause an alternating current output to be produced by the second inverter means 40 across the secondary winding sections 65 and 67 of the transformer 70. The alternating current output from the second inverter means 40 is then rectified by the rectifiers 87 and 89 to produce a unidirectional output voltage which, when added to the voltage applied at the input terminals 10 and 12, will result in a desired voltage at the output terminals 20 and 28. In other words, the regulator system 30 is adjusted initially for a particular input voltage at the terminals 10 and 12 to obtain the necessary width of the output pulses from the magnetic amplifiers 50 and 60 and from the second inverter means 40 to obtain the desired predetermined voltage at the terminals 20 and 28 across the load circuit, which includes the load 23.

If the voltage at the input terminals 10 and 12 decreases after the initial adjustment of the regulator system 30, the control voltage or signal applied to the control windings 74 and 94 of the magnetic amplifiers 50 and 60, respectively, will decrease to thereby increase the width of the unidirectional output pulses at the terminals 99 and 101. Therefore, the width of the alternating output pulses from the second inverter means 40 which appear across the secondary winding sections 65 and 67 of the transformer 70 will also increase. The unidirectional output voltage from the regulator system 30 which is added to the voltage applied to the input terminals 10 and 12 across the load 23 will then increase to maintain the total voltage across the load 23 at the predetermined value.

On the other hand, if the voltage applied at the input terminals 10 and 12 increases after the initial adjustment of the regulator system 30, the control voltage or signal applied to the control winding 74 of the magnetic amplifier 50 and to the control winding 94 of the magnetic amplifier 60 will increase, and the width of the unidirectional output pulses appearing between the terminals 99 and 101 will decrease. Therefore, the width of the alternating output pulses from the second inverter means 40 which appear across the secondary winding sections 65 and 67 of the transformer 70 will also decrease, and the average value of the unidirectional output voltage from the regulator system 30 will decrease. The sum of the unidirectional output voltage from the regulator system 30 and the voltage applied at the input terminals 10 and 12 will, therefore, remain at the predetermined value across the load 23.

In summary, the regulator system 30 operates to provide a unidirectional output voltage or boost voltage which varies inversely with the voltage applied at the input terminals 10 and 12 from a source (not shown) of direct current. Therefore, the sum of the boost voltage from the regulator system 30 and the voltage applied at the input terminals 10 and 12 is maintained at substantially a predetermined value after the initial adjustment of the regulator system 30. It is to be noted that only a portion of the power supplied at the input terminals 10 and 12 passes through the regulator system 30 to the load circuit, including the load 23, connected at the terminals 20 and 28. Therefore, the regulator system 30 has a much higher efficiency than a conventional dissipative type regulator system.

It is to be understood that an electrical control circuit incorporating the teachings of this invention could be provided in which the voltage applied at the input terminals 10 and 12 was substantially constant or remained at substantially a predetermined value. In such a control circuit, the control windings of the magnetic amplifiers 50 and 60 could be connected to an external source of control current or signal, and the output voltage at the terminals 20 and 28 would vary with the control signal applied to the control windings of the magnetic amplifiers 50 and 60. In the latter case, the boost voltage added to the voltage applied at the input terminals 10 and 12 would vary with the external control signal or current rather than with the voltage applied at the input terminals 10 and 12, as shown in the regulator system 30.

It is to be understood that an electrical control system, such as a regulator system, could be provided in accordance with the teachings of this invention which would not include the second inverter means 40 if the output of the first inverter means and magnetic amplifier means, 50 and 60, was adequate.

It is to be understood that other types of conventional inverter or oscillator means may be employed in the regulator system 30 and substituted for the first inverter means 100 which is shown as part of the regulator system 30.

The apparatus embodying the teachings of this invention has several advantages. For example, the regulator system shown in the drawing handles only a portion of the electric power which flows from a source of unidirectional or direct current to a load circuit, while maintaining the voltage across the load circuit at a predetermined value, even though the voltage of the source varies over a wide range. Therefore, the efficiency of the regulator system 30 is much higher than in a conventional dissipative type regulator system. Similarly, an electrical control circuit incorporating the teachings of this invention would also have a high efficiency while controlling the output of a direct current circuit in response to an externally applied control signal or current. In addition, the regulator system 30 is comprised completely of static components and, therefore, requires a minimum of maintenance.

Since numerous changes may be made in the above-described apparatus and circuits and different embodiments of the invention may be made without departing from the spirit thereof, it is intended that all the matter contained in the foregoing description or shown in the accompanying drawing shall be interpreted as illustrative and not in a limiting sense.

We claim as our invention:

1. In an electrical control circuit, the combination comprising a source of direct current having a substantially constant voltage for supplying current to a load circuit including a load, first inverter means connected to said source for providing an alternating current output, magnetic amplifier means having a control winding connected to be responsive to a control voltage applied thereto, said magnetic amplifier means being connected in circuit relation with said first inverter means for providing output pulses of alternating polarity whose width varies with said control voltage, second externally excited inverter means connected in circuit relation with said magnetic amplifier means and said source to be responsive to the output pulses of said magnetic amplifier for producing alternating output pulses, and rectifier means connected in circuit relation with said second inverter means for rectifying said alternating output pulses and producing a unidirectional output which varies with said control voltage, the sum of the voltage of said source and said unidirectional output being applied to said load circuit.

2. In combination, a source of direct current having a varying voltage for supplying current to a load circuit including a load, inverter means connected to said source for providing an alternating current output, magnetic amplifier means having a control winding connected to be responsive to the voltage of said source, said magnetic amplifier means being connected in circuit relation with said inverter means for providing output pulses of alternating polarity whose width varies with the voltage of said source, means for amplifying said pulses connected in circuit relation with said magnetic amplifier means, and rectifying means connected in circuit relation with said amplifying means for providing a unidirectional output which varies inversely with the voltage of said source, said load circuit being connected to be responsive to the sum of said unidirectional output and the voltage of said source.

3. In an electrical control circuit, the combination comprising, a source of direct current having a substantially constant voltage for supplying current to a load circuit including a load, inverter means connected to said source for producing an alternating current output, first rectifier means connected in circuit relation with said inverter means for producing unidirectional output pulses, magnetic amplifier means having a control winding connected to be responsive to a control signal applied thereto, said magnetic amplifier means being connected in circuit relation between said inverter means and said first rectifier means for varying the width of said unidirectional pulses, a plurality of switching transistors connected in circuit relation with said first rectifier means for producing alternating output pulses whose width varies with the width of the output pulses of said first rectifier means, and second rectifier means connected in circuit relation with said transistors and said load circuit for providing a unidirectional output voltage which varies with the width of said alternating output pulses, the sum of said unidirectional output voltage and the voltage of said source being applied to said load circuit.

4. In an electrical control circuit, the combination comprising, a source of direct current having a substantially constant voltage for supplying current to a load circuit including a load, inverter means connected to said source for producing an internating current output, magnetic amplifier means having a control winding disposed to be responsive to a control signal applied thereto, said magnetic amplifier means being connected in circuit relation with said inverter means for changing said alternating current output to pulses of alternating polarity having a width which varies inversely with said control signal, and rectifier means connected in circuit relation between said magnetic amplifier means and said load circuit to be responsive to said pulses for providing a unidirectional output voltage which varies inversely with said control signal, the sum of said unidirectional voltage and the voltage of said source being applied to said load circuit.

5. In a regulator system for maintaining the voltage applied to a load circuit from a source of direct current at a predetermined value, the combination comprising a first free-running inverter means connected to said source for providing an alternating current output, magnetic amplifier means having a control winding connected to said source, said magnetic amplifier being connected in circuit relation with said first inverter means for providing output pulses of alternating polarity whose width varies with the voltage of said source, a second externally excited inverter means connected in circuit relation with said source and said magnetic amplifier for providing an alternating current output of pulses having substantially the same width and frequency as the output pulses from said magnetic amplifier, and rectifier means connected in circuit relation with said second inverter means for rectifying the pulses from said second inverter means and providing a unidirectional output voltage which varies inversely with the voltage of said source, the voltage applied to said load being the sum of said unidirectional voltage and the voltage of said source.

6. In a regulator system for maintaining at a predetermined value the voltage across a load circuit supplied from a source of direct current having a varying voltage, the combination comprising first inverter means including a pair of transistors and saturable core means connected in circuit relation with said source for producing an alternating current output, magnetic amplifier means having a control winding connected to be responsive to the voltage of said source, said magnetic amplifier means being connected in circuit relation with said first inverter means for converting said alternating current output to output pulses of alternating polarity having a width which varies inversely with the voltage of said source, second inverter means connected in circuit relation with said source and said magnetic amplifier means to be responsive to the output pulses of said magnetic amplifier means for producing alternating output pulses, and rectifier means connected in circuit relation with said second inverter means and said load circuit for providing a unidirectional output voltage which varies inversely with the voltage of said source, the sum of said unidirectional output voltage and the voltage of said source being applied to said load circuit.

7. In a regulator system for maintaining at a predetermined value the voltage across a load circuit supplied from a source of direct current having a varying voltage, the combination comprising inverter means connected to said source of producing an alternating current output, first rectifier means connected in circuit relation with said inverter means for producing unidirectional output pulses, magnetic amplifier means having a control winding connected to be responsive to the voltage of said source, said magnetic amplifier means being connected in circuit relation between said inverter means and said first rectifier means for varying the width of said pulses, a plurality of switching transistors connected in circuit relation with said first rectifier means and said source for producing alternating output pulses whose width varies with the output pulses of said first rectifier means, and second rectifier means connected in circuit relation with said transistors and said load circuit for providing a unidirectional output voltage which varies inversely with the voltage of said source, the sum of said unidirectional output voltage and the voltage of said source being applied to said load circuit.

8. In a regulator system for maintaining at a predetermined value the voltage across a load circuit supplied from a source of direct current having a varying voltage, the combination comprising inverter means connected to said source for producing an alternating current output, magnetic amplifier means having a control winding connected to be responsive to the voltage of said source, said magnetic amplifier means being connected in circuit relation with said inverter means for changing said alternating current output to pulses of alternating polarity having a width which varies inversely with the voltage of said source, and rectifier means connected in circuit relation between said magnetic amplifier means and said load circuit to be responsive to said pulses for providing a unidirectional output voltage which varies inversely with the voltage of said source, the sum of said unidirectional output voltage and the voltage of said source being applied to said load circuit.

No references cited.